2,863,286

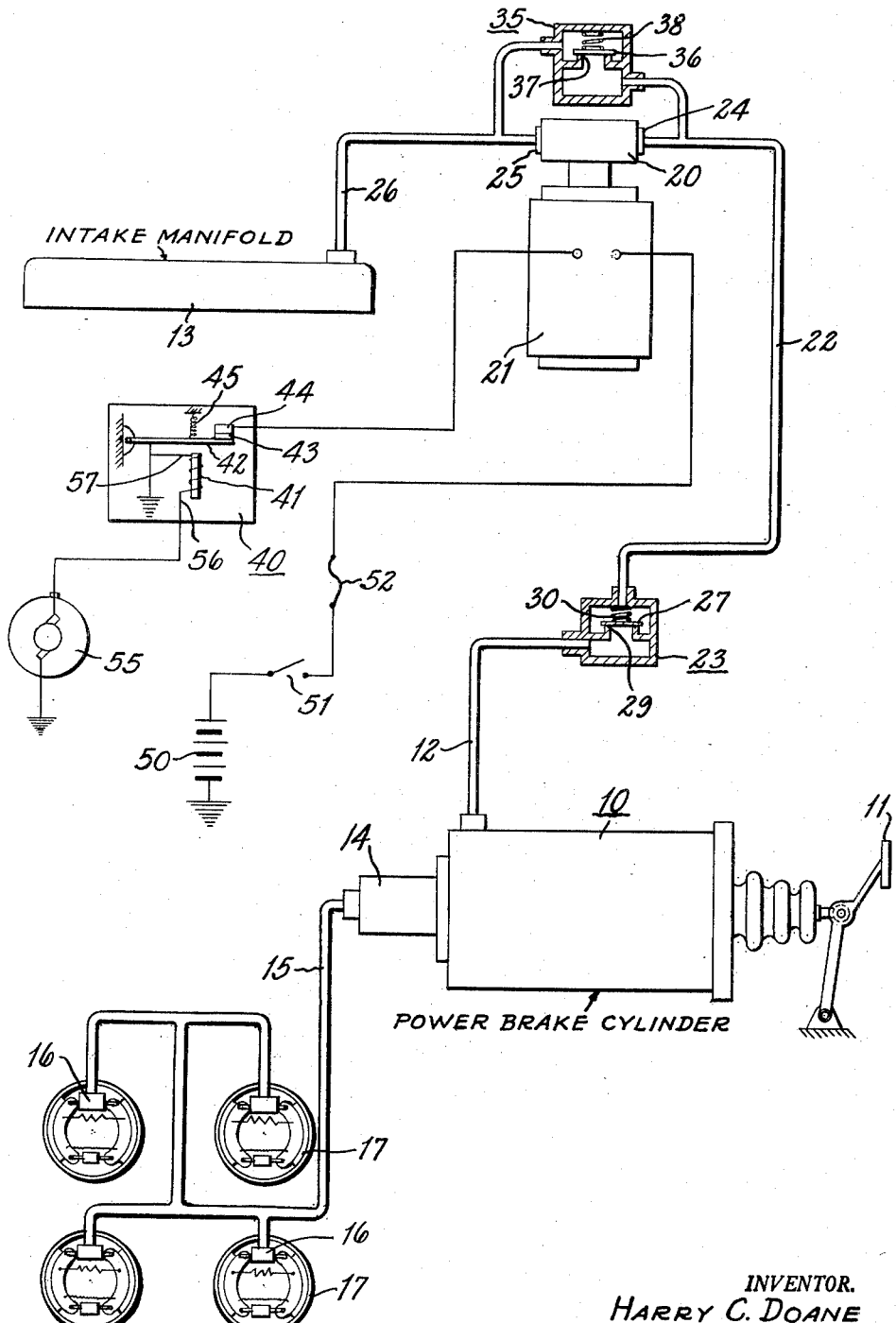

CONTROL SYSTEM FOR POWER BRAKE SYSTEM UTILIZING AUXILIARY VACUUM PUMP

Harry C. Doane, Flint, Mich., assignor to General Motors Corporation, Detroit, Mich., a corporation of Delaware Application June 7, 1954, Serial No. 434,694

3 Claims. (Cl. 60—60)

This invention relates to power brake systems for motor vehicles, and particularly to a braking system utilizing the vacuum power from the intake manifold of the engine.

Under certain adverse conditions motor vehicle engines tend to stall. At these times the failure of the vacuum power in the intake manifold of the engine results in failure of power to the power unit of the power braking system. While direct manual braking action can be obtained through the power brake unit of the power brake system, yet the pedal effort required for such manual operation greatly exceeds that normally required for conventional types of manually actuated brake systems. Thus failure of power to the power brake system results in an element of surprise to the operator of the motor vehicle which may be sufficient to cause the operator to get into difficulty.

Normally, so long as the engine of a motor vehicle operates above a predetermined speed value there is little likelihood of effecting a stall condition of the engine. The engine is particularly susceptible to a stall condition when operating under an engine idle speed, sudden changes in road or carburetion conditions resulting in the engine stall.

The normal engine idle speed varies with engines of different makes, but generally there is a predetermined normal engine idle speed that is recommended. When the engine operates at less than the normally recommended idle speed, there is the tendency to stall.

For example, if the engine is adjusted to having normal idle speed of about 450 R. P. M., an engine operation of much less than this will tend to create the stall. Thus if the speed of the engine drops to 300 R. P. M., for example, there is a greater tendency for the engine to stall than when operated at its normal idle speed.

It is therefore an object of this invention to provide a supplementary or secondary source of vacuum power that is available for use when the primary source of vacuum power in a power actuated system fails to supply sufficient motive power for operation of the power brake unit.

It is thus another object of the invention to provide a stand-by electrically operated secondary vacuum power source for a power actuated brake system that can be rendered active at any time the engine of the motor vehicle operates below a predetermined speed value.

It is another object of the invention to provide a power brake system in accordance with the foregoing object wherein the electrically operated secondary source of vacuum power is rendered effective solely in response to the voltage output of the electric generator of the motor vehicle. Since the voltage output of the generator varies directly with engine speed up to a maximum value, the electrically operated secondary source of vacuum power can be rendered effective in response to generator voltage output so that the secondary source of vacuum power is ineffective so long as the voltage output from the generator is above a predetermined value and will be rendered effective when the voltage output from the generator falls below the predetermined value. The values selected to effect ineffectiveness or effectiveness of the secondary vacuum power source can thus be representative of the normal engine idle speed at which the secondary vacuum source will be rendered ineffective and a lower engine speed at which the engine would tend to stall to obtain effective operation of the secondary vacuum source at this time.

It is therefore another object of the invention to provide a power brake system in accordance with the foregoing objects wherein the secondary source of vacuum power is provided with electric current for operation of the same in response to actuation of an electric switch that is energized solely by voltage output from the electric generator of the motor vehicle in a manner that the electric switch is energized to open circuit to the electrically operated secondary vacuum power source so long as the generator voltage output is above a predetermined value and the switch will permit closing of electric circuit to the aforesaid secondary vacuum source when the generator voltage output falls below the predetermined value or ceases.

Further objects and advantages of the present invention will be apparent from the following description, reference being had to the accompanying drawings wherein a preferred form of the invention is clearly shown.

In this invention the vacuum operated power brake system includes a vacuum operated power brake unit 10. This vacuum operated power brake unit can be of any of the conventional forms of power units currently produced for this purpose, and which is well-known in the art. The power brake unit is operated by a foot pedal 11 suitably connected with the control valve of the power unit for regulating the supply of vacuum power to the unit from the vacuum line 12 that is suitably connected with the intake manifold 13 of the engine of the motor vehicle.

The power unit 10 includes a master cylinder 14 that supplies hydraulic fluid under pressure to the brake line 15. The brake line 15 is connected with the wheel cylinders 16 of the hydraulic brakes 17 provided on the motor vehicle.

Under normal operation, when the brake pedal 11 is actuated, the control valve of the power unit 10 is operated to provide control over the vacuum power for the power unit 10 which effects operation of the power piston of the power unit and it in turn operates the piston of the master cylinder in conventional and well-known manner. The power brake unit 10 can be of either the air suspended type in which atmospheric air is normally present on both side of the power piston of the unit, and evacuation of the power cylinder on one side of the power piston by connection thereof with the vacuum line 12 results in power actuation of the power piston from the atmospheric pressure on the opposite side of the piston, or can be of the vacuum suspended type in which vacuum is normally provided on both sides of the power piston in constant communication with the vacuum line 12 so that operation of the control valve of the power unit will effect connection of one side of the power piston with the atmosphere to provide the power for actuating the power piston.

In either type of vacuum operated power brake unit the control is provided by the vacuum power source through the vacuum line 12 that is connected with the intake manifold 13 of the engine of the motor vehicle. Should the primary source of vacuum power in the manifold 13 of the engine fail for any reason, such as stalling of the engine with the ignition switch turned "on," suitable vacuum power fails to be supplied to the power unit 10 to effect the desired power operation of the unit. Under these circumstances the piston of the master cylinder is operated directly by the foot pedal 11 through the power unit 10. Without the aid of the power unit 10, the pedal pressure required for operation of the piston of the master cylinder is greatly increased.

Thus in this invention there is provided an auxiliary or secondary vacuum power source that becomes effective at any time the vacuum power in the primary source of the intake manifold of the engine fails, or reduces to a sufficiently low value as to be ineffective for satisfactory operation of the vacuum operated power unit 10.

The auxiliary or secondary vacuum power source comprises a vacuum pump 20 that is connected to an electric motor 21 for driving the pump. This electrically actuated device is normally inactive so long as the engine of the motor vehicle is running. However, when the vehicle engine stops the auxiliary or secondary vacuum power source is rendered effective to supply vacuum power to the vacuum operated power unit 10.

The vacuum pump 20 may be of any of the conventional types and has the inlet side thereof connected with the vacuum line 12 of the power unit 10 by a line 22, a check valve 23 being placed between the inlet 24 of the vacuum pump and the power unit 10. The discharge connection 25 of the vacuum pump 20 is connected with the intake manifold 13 of the vehicle engine through the pipe line 26.

The check valve 23 can be of any of the conventional types in which a valve element 27 is retained on a valve seat 29 by a spring 30 so that flow of fluid through the check valve 23 will be in a direction from the power unit 10 to the vacuum pump 20, the check valve preventing reverse flow of fluid, and thus preventing atmospheric air entering the power unit 10 through the vacuum line 12 whenever the engine of the motor vehicle is not operating.

A second check valve 35 is provided between the inlet connection 24 of the vacuum pump 20 and the line 26 connecting the outlet 25 of the pump 20 with the intake manifold 13. This check valve comprises a valve element 36 seated upon a valve seat 37 and retained thereon by a spring 38. This check valve 35 provides a by-pass connection around the vacuum pump 20 so that the primary vacuum power source, the intake manifold of the engine, will be directly connected with the vacuum line 12 of the power unit 10 through the check valves 35 and 23, and thereby provide for completely free flow of fluid from the power brake unit 10 to the intake manifold 13, the restriction of the vacuum pump itself being thus eliminated from the vacuum connection between the intake manifold 13 and the power unit 10.

To provide for automatic operation of the electrically actuated vacuum pump 20 a relay 40 is provided to control operation of the electric motor 21. The relay 40 comprises a solenoid actuating coil 41 adapted to move the contact arm 42 with the contact 43 thereof into and out of engagement with the stationary contact 44 depending upon the degree of energization of the coil 41. A light spring 45 normally urges the contact 43 into engagement with the contact 44, as illustrated in the drawing.

The contacts 43 and 44 are in series circuit with the electric motor 21 and the battery 50. An ignition switch 51 is placed in the circuit between the battery 50 and the motor 21, this circuit also including a conventional fuse 52. One side of the battery 50 as well as the contact arm 42 is grounded to complete the conventional circuit within the motor vehicle.

The solenoid coil 41 is in series circuit with the generator 55. One end 56 of the solenoid coil 41 is connected with the output side of the generator 55 while the opposite side 57 of the solenoid coil 41 is grounded as is the opposite side of the generator to thereby complete circuit between the generator and the solenoid coil 41.

The solenoid coil 41 is thus solely responsive to the voltage output of the generator, thus the degree of energization of the coil 41 varies with the voltage output of the generator 55 as reflected by the speed of operation of the generator as driven by the engine of the motor vehicle.

There is of course provided the usual voltage controls for the generator to limit its maximum output and to vary the output in accordance with the demands of the battery for charging.

So long as the voltage output from the generator 55 is above a predetermined value, the solenoid coil 41 attracts the arm 42 to effect opening between the contacts 43 and 44 with resultant brake of circuit to the electric motor 21. However, whenever the voltage output of the generator falls below the predetermined value, the attraction of the solenoid coil 41 for the arm 42 will be lessened so that the spring 45 will effect release of the arm 42 from the effect of the coil 41 to provide for closing of the contact 43 upon the contact 44 and thereby make electric circuit to the electric motor 21.

At low engine speeds, such as idling speeds, the voltage output of the generator substantially reflects motor engine speed. Thus, it is possible to provide an electric control sensitive to engine speed that will render the electric motor 21 for the vacuum pump ineffective so long as engine speed is above a predetermined value but which will render the electric motor 21 for the pump 20 effective when engine speed falls below the predetermined value.

An idling engine is quite susceptible to stall. When this occurs the manifold vacuum is insufficient to provide for any substantial power brake applications. Under these conditions therefore it is essential that the auxiliary vacuum pump 20 be rendered effective before the manifold vacuum fails so that there will be no failure of sufficient vacuum power at any time to provide for full and complete brake applications through the power unit 10.

The voltage responsive relay 40 thus provides a means to anticipate engine stall since the voltage sensitive solenoid coil 41 is calibrated to effect opening of the contacts 43 and 44 at a generator voltage output representative of an engine idle speed of a normal value, for example, 450 R. P. M. When the engine idle speed falls to a lower value, for example, 300 R. P. M., the voltage output of the generator will be of sufficient low value as to permit closing of the contacts 43 and 44 whereby to render the electric motor 21 effective to operate the vacuum pump 20. Even though the engine may not stall at the lower engine idle speed, the susceptibility of the engine to stall at this speed is relatively high. Thus the voltage sensitive relay will anticipate stall conditions of the engine to render the auxiliary vacuum pump 20 effective before the actual stall occurs. Thus, at no time will there be insufficient vacuum power to operate the power brake cylinder 10 at any time the engine operates at low engine speeds or even ceases. So long as the ignition switch 51 is closed the electric motor 21 will remain operative to drive the vacuum pump 20 until the engine is re-started and has gained sufficient speed to build up the generator voltage to the predetermined value at which the voltage sensitive relay 40 will again open the contacts 43 and 44.

While the form of embodiment of the invention as herein disclosed constitutes a preferred form, it is to be understood that other forms might be adopted as may come within the scope of the claims which follow.

What is claimed is as follows:

1. In a power braking system for a motor vehicle, the combination of, a vacuum regulated power unit adapted for connection with and operation of the brakes of a motor vehicle, a primary source of vacuum power connected with said power unit normally to effect operation thereof, an electrically operated secondary source of vacuum power connected with said power unit to operate the same, a motor vehicle electric generator driven by the engine of the vehicle with resultant variation in voltage output dependent upon the increase and decrease of speed of the engine of the vehicle, a battery, electrical conductor means for connecting said battery to ground, an electrical operating means for operating said secondary source of vacuum, an electrical conductor means for connecting the opposite side of said battery to said electrical operating means, an electrically inactivated switch means, an electrical conductor means connecting said electrical operating means with said electrically inactivated switch means, an electrical conductor connecting the opposite side of said electrically inactivated switch means to ground, electrical inactivating means for inactivating said switch, electrical conductor means connecting said electrical inactivating means to ground, electrical conductor means for connecting said electrical inactivating means to said generator, electrical conductor means connecting the opposite side of said generator to ground, said electrical inactivating means thereby rendering said switch means inoperative by generator voltage only representative of engine speed of a predetermined value to render ineffective said secondary source at all engine speeds above said predetermined value, said switch inactivating means being responsive to and rendered insufficiently operative to hold open said switch when a drop in generator voltage representative of an engine speed below said predetermined value and thereby permit closing of said switch means and render said secondary source effective at all engine speeds below said predetermined value.

2. In a power braking system for a motor vehicle, the combination of, a vacuum regulated power unit adapted for connection with and operation of the brakes of a motor vehicle, a primary source of vacuum power connected with said power unit normally to effect operation thereof, an electrically operated secondary source of vacuum power connected with said power unit to operate the same, a source of electric current, an electrically operated means for operating said secondary source of vacuum, electrical conductor means connecting said battery with said electrically operating means, a switch means, electrical conductor means for connecting said switch means to said electrically operating means, electrical conductor means connecting the opposite side of said switch means and the opposite side of said source of electric current to ground, a motor vehicle generator operated by the vehicle engine with resultant electrical output which is dependent upon the speed of the engine, an electrical inactivating means for opening said switch, electrical conductor means connecting said electrical inactivating means with said generator, electrical conductor means connecting the opposite side of said electrical switch inactivating means and the opposite side of said generator to ground, said electrical switch inactivating means in said generator circuit responsive only to generator output to effect opening of said switch means only when the generator output is above a predetermined value, said last mentioned means being ineffective to maintain said switch means open when the generator output drops below said predetermined value.

3. In a power braking system for a motor vehicle, the combination of, a vacuum-regulated power unit adapted for connection with an operation of the brakes of a motor vehicle, a primary source of vacuum power connected with said power unit normally to effect operation thereof, an electrically-operated secondary source of vacuum power connected with said power unit to operate the same, a battery circuit comprising a battery, an electrical operating means for operating said secondary source of vacuum, electrical conductor means connecting said battery to said electrical operating means, a normally closed solenoid-operated switch means, electrical conductor means connecting said electrical operating means to said solenoid-operated switch means, electrical conductor means connecting the opposite side of said battery and the opposite side of said solenoid-operated switch means to ground, a generator circuit comprising a motor vehicle electric generator, a solenoid for operating said switch, electrical conductor means for connecting said generator to said solenoid, electrical conductor means for connecting the opposite side of said solenoid and the opposite side of said generator to ground, said solenoid switch to open solely by generator voltage above a predetermined value applied to said solenoid to render ineffective said secondary source so long as the generator voltage is above the said predetermined value.

References Cited in the file of this patent

UNITED STATES PATENTS

| | | |
|---|---|---|
| 2,095,833 | Rockwell | Oct. 12, 1937 |
| 2,142,514 | Jones | Jan. 3, 1939 |
| 2,177,491 | Kliesrath | Oct. 24, 1939 |
| 2,323,519 | Dean | July 6, 1943 |
| 2,705,870 | Holton | Apr. 12, 1955 |